United States Patent
Dold

[19]

[11] Patent Number: 6,109,136
[45] Date of Patent: Aug. 29, 2000

[54] REDUCTION GEAR

[75] Inventor: Michael Dold, Donaueschinger, Germany

[73] Assignee: IMS Morat Sohne GmbH, Germany

[21] Appl. No.: 09/127,090

[22] Filed: Jul. 31, 1998

[30] Foreign Application Priority Data

Aug. 1, 1997 [DE] Germany ................ 197 33 497

[51] Int. Cl.$^7$ ................................................. F16H 33/00
[52] U.S. Cl. ......................................... 74/640; 239/227
[58] Field of Search ..................... 74/640, 63; 239/227

[56] References Cited

U.S. PATENT DOCUMENTS

| | | | |
|---|---|---|---|
| 2,714,080 | 7/1955 | Kennedy, Jr. et al. | 239/227 |
| 2,966,808 | 1/1961 | Grudin | 74/640 |
| 3,088,333 | 5/1963 | Musser | 74/640 |
| 3,195,324 | 7/1965 | Sellwood et al. | 74/640 |
| 3,902,670 | 9/1975 | Koller et al. | 239/227 |
| 4,244,524 | 1/1981 | Wellings | 239/227 |

FOREIGN PATENT DOCUMENTS 1182011  11/1964  Germany .

296 14 738
U1  12/1996  Germany ............... H16H 25/06

*Primary Examiner*—David A. Bucci
*Assistant Examiner*—Colby Hansen
*Attorney, Agent, or Firm*—Pendorf & Cutliff

[57] ABSTRACT

Differential transmission with a rigid support ring (1) which exhibits an essentially cylindrical bearing surface (2) and with a radially flexible roller bushing (5) which has an outer surface (7) with a circumference smaller than the bearing surface (2), wherein one or more circumference segments of the outer surface (7) are maintained in essentially slip-free engagement with the bearing surface (2) of the support ring (1) via multiple transmission elements (32), said engagement progressively successively changeable by rotation of a drive core (20) rotatably provided within the roller bushing (5) and rotatably driven by a drive shaft (14), wherein the transmission elements (32) are formed by a multitude of essentially radially extending segments of equal length, that the roller bushing is supported upon the drive core (20) via these segments, and that the segments with their radial side surfaces lie against each other and with respect to each other are radially slidable.

5 Claims, 3 Drawing Sheets

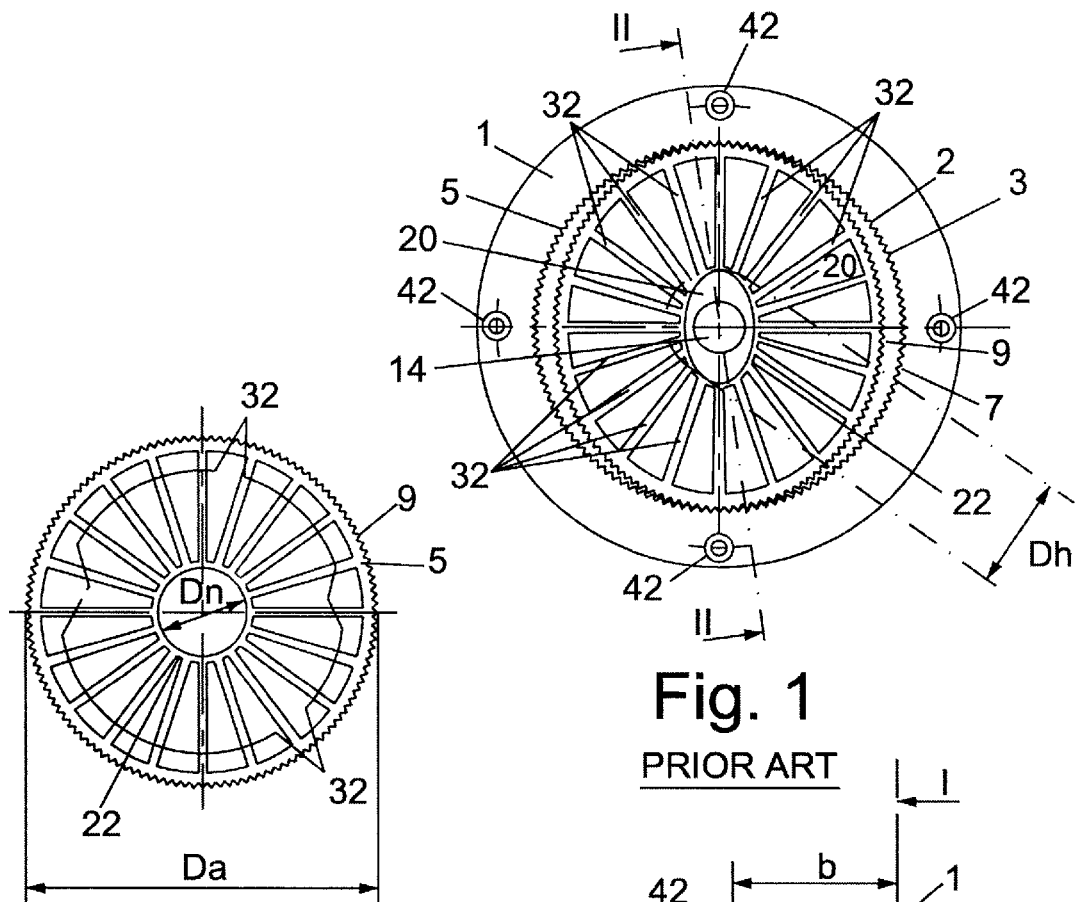
Fig. 1
PRIOR ART
Fig. 3
PRIOR ART
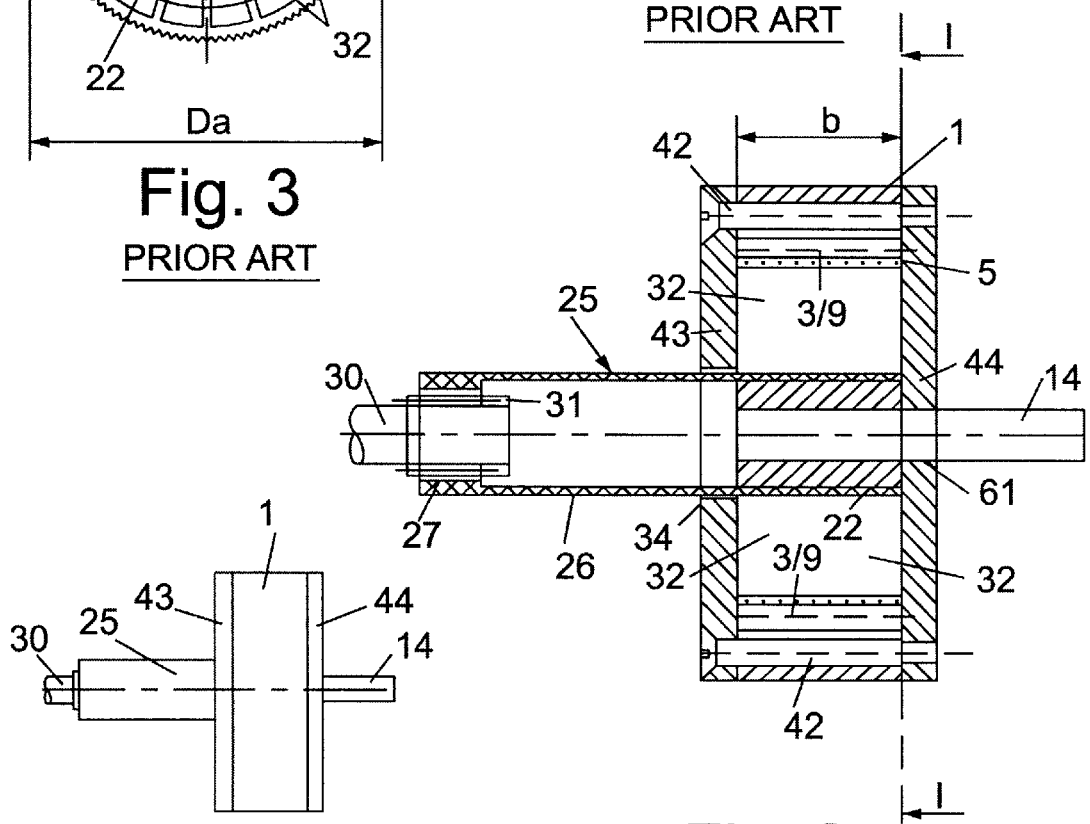
Fig. 4
PRIOR ART
Fig. 2
PRIOR ART

REDUCTION GEAR

DESCRIPTION OF THE RELATED ART

A gear of this type is shown in German Design Patent 296 14 738.9, which is expressly referenced as showing the state of the art.

SUMMARY OF THE INVENTION

In comparison to other corrugated gear units or, as the case may be, harmonic drive gear units, there is achieved not only a substantially more economic manner of production, but rather there is also made available in practice a significantly greater variation in the possible construction embodiments and, in particular, a very small and compact type of construction. Also, a precision of the rotational transmission can be achieved with substantially simpler means. Namely there is, in the inventive embodiment of the gear, in no case a need for a roller bearing or ball bearing between the roller bushing and the drive core or, as the case may be, the encompassing bearing hub.

A further important advantage is comprised therein, that the drive is self-locking or -retaining, that means, that no torque no matter how large exercised upon the roller bushing is in the condition to rotate the drive shaft forwards or backwards. At the same time, this also means that the drive shaft placed into driven engagement by the roller bushing during a resting of the gears or, as the case may be, standing still of the drive, respectively assumes an exactly defined angular position, which can only be changed by the drive shaft, that is, by the corresponding rotation of the drive core in the one or the other direction.

BRIEF DESCRIPTION OF THE DRAWINGS

FIG. 1 is a front sectional view of a conventional corrugation type reduction gear mechanism with spoke-type transmission elements;

FIG. 2 is a side sectional view of a reduction gear mechanism;

FIG. 3 is a front view of the conventional element comprising mounting hub, spoke-type transmission element, and roller bushing;

FIG. 4 is an external side view of the reduction gear according to FIG. 2;

DETAILED DESCRIPTION OF THE INVENTION

Figure 5:
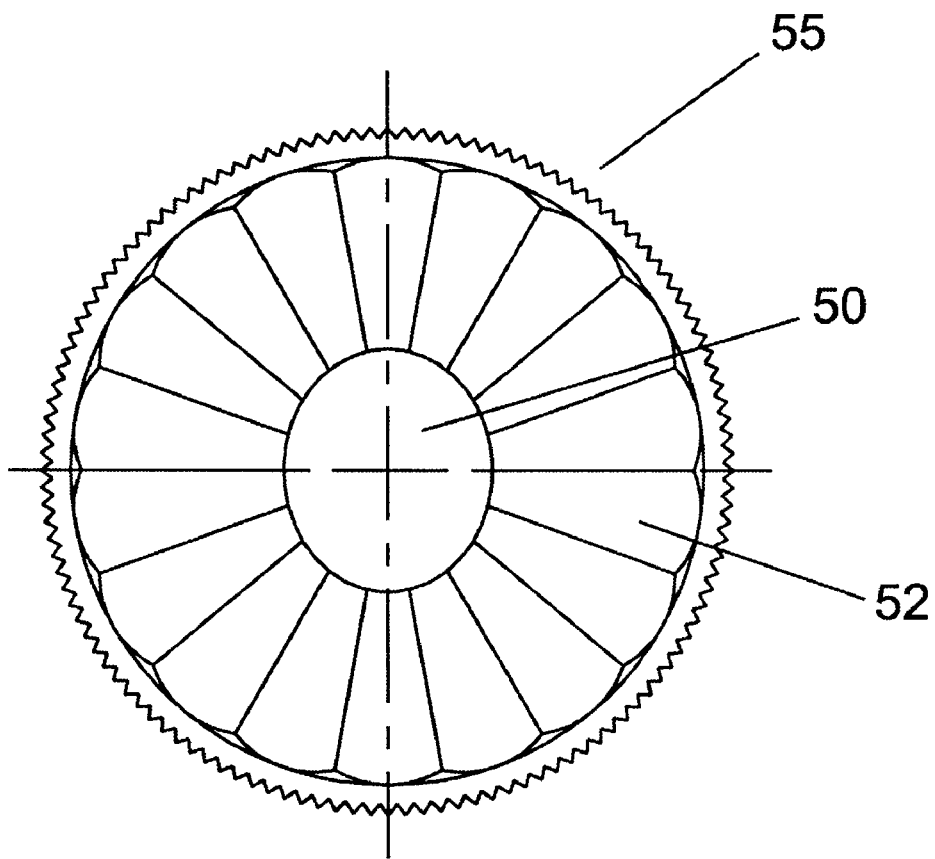
FIG. 5 is a detailed view of the improved transmission elements according to the present invention.

The basic component of the drive gear is, as shown in FIGS. 1 through 4, in each case a round circular support or bearing ring 1 with a circular inner bearing surface 2, a roller bushing 5 with an outer surface 7 and an elliptic or triangular drive core 20 or, as the case may be, 20/1.

In the illustrative embodiment according to FIG. 1, 2 and 3 the cylindrical support ring 1 is provided with an inner teething or gearing 3, which extends along its entire thickness b. This support ring 1 is non-rotationally connected with an, not shown in the drawing, gear or transmission carrier or the like, as a fixed drive component. On both its planar surfaces there are respectively provided front and back walls 43 and 44, which are connected with each other or as the case may be with the support ring 1 via axial screws 42. In a central bore 61 of the wall 44 a drive shaft 14 is rotatably mounted, which is in connection with, for example, a drive motor and via this can be driven in one or the other rotational direction. On this drive shaft 14 the drive core 20 is rotatably provided so that the drive core, with angular precision, also rotates with the drive shaft 14, when this is being driven.

The roller bushing 5 which in its basic form is circular is provided with an outer teething 9, which in the illustrative embodiment according to FIGS. 1 through 3 exhibits the same thickness b as the support ring 1 or, as the case may be, the inner teething thereof. This outer teething 9 of the roller bushing 5 is, as can be seen from FIG. 1, with two of its diametrically opposing circumference segments respectively with multiple teeth in engagement with the inner teeth 3 of the support ring 1. This is possible because the roller bushing 5 is radially flexible and is unitarily connected with the inner bearing bushing 22 via radial transmission elements, in this case constructed in the form of spokes 32, within which the drive core 20 is rotatably provided.

The inner diameter $D_n$ or as the case may be the therefrom resulting inner circumference length of the bearing bushing 22 is thereby so selected or designed, that in the assembled condition according to FIG. 1 and 2 it encompasses the elliptic drive core 20 at least approximately without play.

The inner diameter $D_n$ of mounting hub 22, which in its basic form is cylindrical, is smaller at least by a factor of one quarter to one third than the outer diameter $D_a$ of roller bushing 5 which in its base shape is likewise cylindrical. In the embodiment represented in FIGS. 1 through 3 the roller bushing 5 and the support hub 22 with the transmission elements formed as spokes 32 form a one-piece plastic construction component 35, which can be very economically produced and also be simply assembled. As a consequence of the relatively high elasticity, with which the support hub 22 can thus be constructed, the unround drive core 20 can very easily be introduced into the support hub 22.

As a result of the rotational movement of the eccentric, that is, elliptical drive core 20 in the support hub 22, this is continuously deformed elliptically. This elliptic deformation is transmitted via the spokes 32 also upon the roller bushing 5, so that different teeth of the outer teething 7 of the roller bushing 5 continuously come into engagement with the inner teething 3 of the stationary support ring 1.

Since the number of teeth $Z_1$ of the outer gear 9 of the roller bushing 5 is smaller than the number of teeth $Z_2$ of the inner teething 2 of the support ring 1, there results thereby a continuous rotation of the roller bushing 5 with respect to the stationary support ring 1, and this is in the counter-rotation direction of the drive shaft 14 or, as the case may be, drive core 20.

As already discussed above, the transmission or translation achieved between the rotation count of the drive shaft 14 and the rotation count of the roller bushing 5 can be calculated by the following formula:

$$i = \frac{Z_2}{Z_1 - Z_2}$$

When for example the roller bushing 5 has the tooth number $Z_1$=98 and the support ring 1 the tooth number $Z_2$=100, so there results from the above formula the translation or transmission i=1:50.

Instead of the tooth count one can also change the circumference length of the inner surface 2 as $Z_2$ and the circumference length of the outer surface 7 of the roller bushing 5 as $Z_1$, in order to arrive at the same result.

By this it is meant that it is not necessarily that a tooth engagement must exist between the support ring 1 and the roller bushing 5, since it is also possible that the transmission is formed as a purely fictional transmission, as is described in greater detail in the following.

As can be seen from FIG. 2, the mounting hub 22 exhibits as a connecting element 25 a thin-walled elastic deformable hollow shaft 26, which in its fundamental shape is likewise cylindrical, which via inner teething 27 is coupled with a pinion 31 of a drive shaft 30. This hollow shaft 26 extends, with sufficient radial play, through a sufficiently wide central axial bore 34 of the surface wall 43.

As a result of this connecting element 25 the rotational movements of the roller bushing 5 or, as the case may be, the bearing bushing 22, are transmitted to the drive shaft 30.

Beginning with this known transmission it is the object of the present invention to further improve the effectiveness of the transmission.

Further developments are set forth in the dependent claims.

Figure 6:
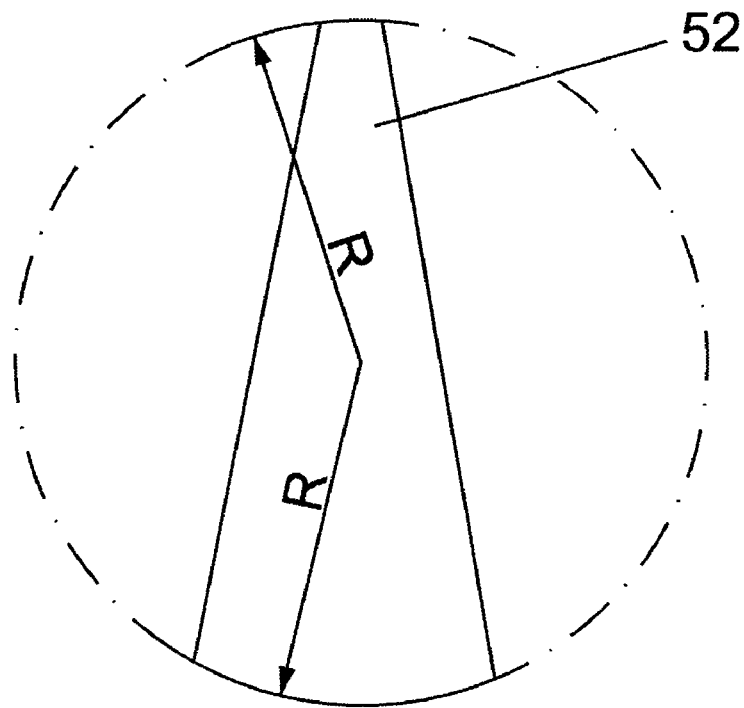
FIG. 6 schematically shows how providing internal and external surfaces of equal curvature and center can prevent play upon tilting of transmission elements.

In FIGS. 5 and 6 the invention is represented in greater detail.

The transmission elements 52 are thus constructed as arc segments, such that the multiple segments provided adjacently essentially completely fill out the empty space between the drive core 50 and the roller bushing 55. The advantage of this arrangement is that the segments 52 under load cannot deviate in the tangential direction, since the hollow space is close to being completely filled out, however, the individual elements 52 are easily displaceable in radial direction with respect to each other and thereby the deformation is transmitted from the drive core out to the roller bushing with minimal loss (FIG. 5).

The contact surfaces between segment 52 and drive core 50 as well as between segment 52 and roller bushing 55 are preferably so constructed, that the slight tipping of segment 52, which necessarily results from the play, has no influence on the separation between the contact surfaces. This can result therefrom, that these two outer surfaces have the same radius of curvature as well as the same center of curvature (FIG. 6).

What is claimed is:

1. Differential transmission with a rigid support ring (1) which exhibits an essentially cylindrical bearing surface (2) and with a radially flexible roller bushing (55) which has an outer surface (7) with a circumference smaller than the bearing surface (2), wherein one or more circumference segments of the outer surface (7) are maintained in essentially slip-free engagement with the bearing surface (2) of the support ring (1) via multiple transmission elements (52), said engagement progressively successively changeable by rotation of a drive core (50) rotatably provided within the roller bushing (55) and rotatably driven by a drive shaft (14), wherein, the transmission elements (52) are formed by a multitude of essentially radially extending segments of equal length, wherein the roller bushing is supported upon the drive core (50) via these segments, and wherein the segments lie against each other with their radial outside surfaces and are radially slidable with respect to each other.

2. Differential transmission according to claim 1, wherein the radially extending elements at at least one of their outer and inner circumference surfaces exhibit essentially (a) the same radius of curvature, (b) the same center point of curvature, or (a) and (b).

3. Differential transmission according to claim 1, wherein the radially extending elements are formed of plastic.

4. Differential transmission according to claim 1, wherein the radially extending elements are formed separately from the roller bushing (55).

5. A corrugated gear with the characteristics:

a rigid support ring (1) with an essentially cylindrical bearing surface (2), a radially flexible roller bushing (55), which exhibits an outer surface (7) with a smaller circumference than the support surface (2), a drive core (50) rotatably driven by a drive shaft (14) and rotatably provided within the roller bushing (5), a plurality of transmission elements (52), via which one or more circumference radially extending elements of the outer surface (7) of the roller bushing (55) are maintained in essentially slip-free and successive engagement with the bearing surface (2) of the support ring (1), wherein:

the transmission elements (52) are a plurality of essentially radially extending radially extending elements of equal length, the roller bushing (55) is supported upon the drive core (50) via the radially extending elements (52), the radially extending elements (52) are provided with their radial side surfaces lying against each other and almost completely fill the hollow space between the drive core (50) and the roller bushing (55), and the radially extending elements (52) are radially displaceable with respect to each other.

* * * * *